United States Patent [19]
Foltyn

[11] Patent Number: 4,778,263
[45] Date of Patent: Oct. 18, 1988

[54] VARIABLE LASER ATTENUATOR

[75] Inventor: Stephen R. Foltyn, Los Alamos, N. Mex.

[73] Assignee: The United States of America as respresented by the Department of Energy, Washington, D.C.

[21] Appl. No.: 55,275

[22] Filed: May 29, 1987

[51] Int. Cl.$^4$ .............................................. G02B 5/28
[52] U.S. Cl. .................................... 350/377; 350/164; 350/166
[58] Field of Search ............... 350/1.6, 372, 394, 408, 350/164, 166, 163, 273, 377; 250/236

[56] References Cited

U.S. PATENT DOCUMENTS 2,941,444  6/1960  Frykman .......................... 350/166
4,281,245  7/1981  Brogardh et al. .................... 250/277
4,530,600  7/1985  Lopez ................................. 350/407

Primary Examiner—Bruce Y. Arnold
Attorney, Agent, or Firm—Ray G. Wilson; Paul D. Gaetjens; Judson R. Hightower

[57] ABSTRACT

The disclosure relates to low loss, high power variable attenuators comprising one or more transmissive and/or reflective multilayer dielectric filters. The attenuator is particularly suitable to use with unpolarized lasers such as excimer lasers. Beam attenuation is a function of beam polarization and the angle of incidence between the beam and the filter and is controlled by adjusting the angle of incidence the beam makes to the filter or filters. Filters are selected in accordance with beam wavelength.

20 Claims, 5 Drawing Sheets

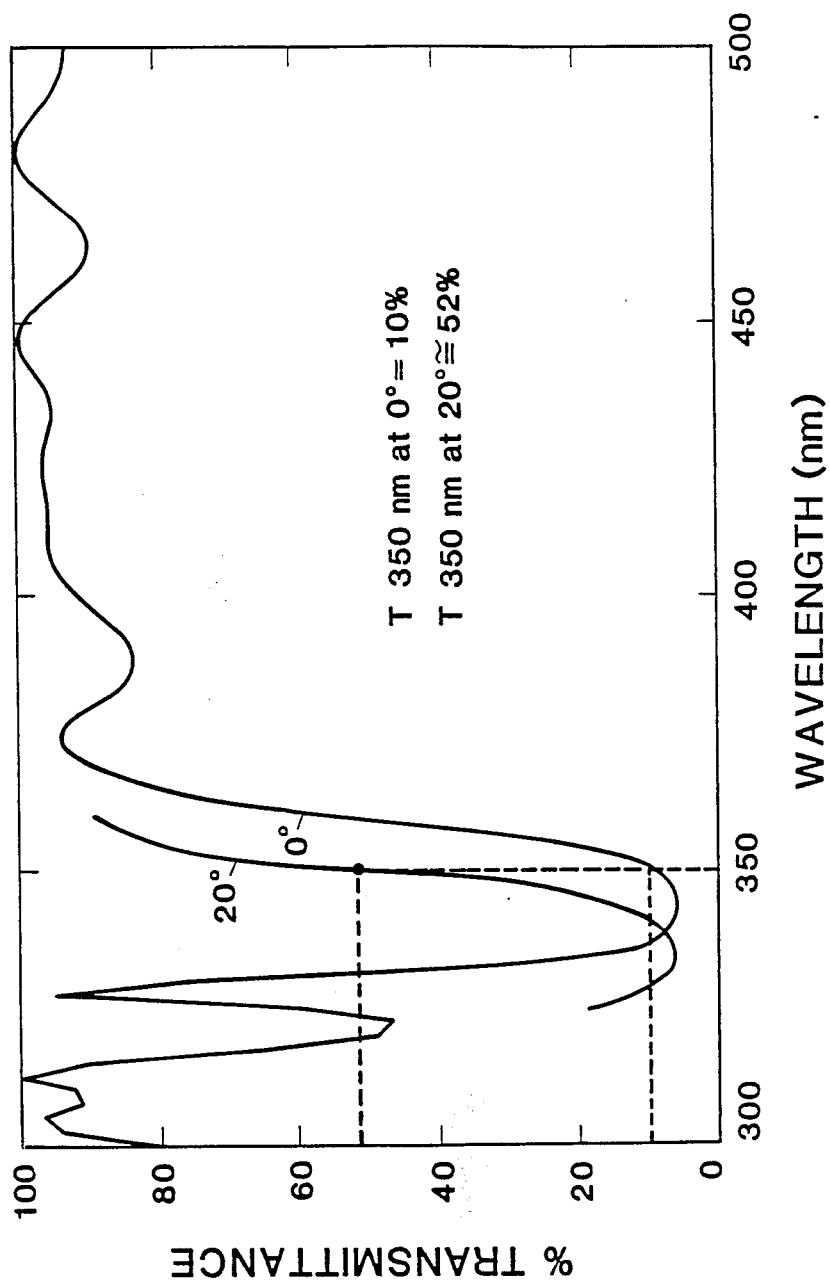

VARIABLE LASER ATTENUATOR

BACKGROUND OF THE INVENTION

The invention relates to laser beam attenuators and, more particularly, laser beam attenuators using transmissive or reflective interference filters such as multilayer dielectric filters. This invention is the result of a contract with the Department of Energy (Contract No. W-7405-ENG-36).

Intensity control is a problem facing many laser users. For example, it can be important to determine and know optical damage thresholds in optical systems and to maintain beam strength below such thresholds. This is typically accomplished with output beam attenuation devices.

Two commonly used devices for attenuating laser beams are polarizers and neutral density filters. A set of wedged plates can be used to generate Fresnel reflection losses, too. None of these techniques are well suited for use with unpolarized, relatively high power lasers such as excimer lasers.

Polarizers are available in a wide assortment of structures and provide, by rotation with respect to linear input polarization, simple and efficient beam attenuation for polarized and collimated input beams. Problems arise, however, if polarizers are used with excimer lasers which produce unpolarized and highly divergent output beams. Collimating such beams adequately for small polarizer acceptance angles is difficult or impossible. Too, polarizers reduce the energy content of unpolarized laser beams on the order of one half. Usually, such large amounts of attenuation are not desired.

Neutral density filters are generally inconel-coated glass or fused silica and are not limited to use with polarized or collimated beams. However, because they operate by absorbing part of the incident radiation from the beam, such filters have very low ultraviolet damage resistance. Damage thresholds of less than 0.05 Joules per square centimeter ($J/cm^2$) at 248 and 351 nanometer (nm) wavelengths have been measured on this type of filter. Furthermore, even at low fluence levels, metallic neutral density filters are subject to changing optical density values during long periods of use.

Wedge plate attenuators may comprise, for example, two pairs of counter rotating quartz wedges. Such attentuators produce excessive losses when used with unpolarized light and provide limited apertures. Also, the wedges cause beam expansion in the plane of incidence that may be unacceptable in some applications.

These and other problems of the prior art are addressed by the present invention, wherein a laser attenuator is provided for unpolarized laser beams which have low energy absorption during beam attenuation.

One object of the invention is to provide variable and selective attenuation for laser beams.

Another object of the present invention is to selectively attenuate unpolarized laser beams.

Still another object of the invention is to provide selective attenuation for polarized laser beams.

Yet another object of the invention is to provide continuously variable laser beam attenuation.

SUMMARY OF THE INVENTION

To achieve the foregoing and other objects, and in accordance with the purposes of the present invention, as embodied and broadly described herein, there is provided an apparatus for attenuating a laser beam having a predetermined wavelength and amount of polarization. The apparatus comprises at least one rotatably positionable interference filter such as a multilayer dielectric filter. Each such filter may be either transmissive or reflective and is positionable within the path of an input laser beam at a preselected angle of incidence thereto. Transmissive filters are positioned to transmit the beam and reflective filters are positioned to reflect the beam. Each filter attenuates the beam a predetermined amount in accordance with its angle of incidence to the beam and the amount of polarization in the beam. The beam may be unpolarized or polarized and may be from an excimer laser. Transmissive filters may have either one or both surfaces coated with multiple layers of dielectric material and may comprise quarter-wave dielectric reflectors. The filters are selectable for particular beam wavelengths and may comprise long or short pass filters.

One advantage of the present invention is that laser beams are nonabsorbently attenuated, thereby eliminating damage from heat associated with absorbent filtering.

Another advantage of the invention is that high power and large laser beams may be attenuated.

Yet another advantage is that low loss is experienced for unpolarized as well as polarized beams.

Still another advantage is that attenuation is variable through automatic feedback.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification, illustrate the embodiments of the present invention and, together with the description, serve to explain the principles of the invention. In the drawings:

FIG. 9 shows a spectral transmittance scan for a long-pass edge filter.

DETAILED DESCRIPTION OF THE INVENTION

Figure 10:
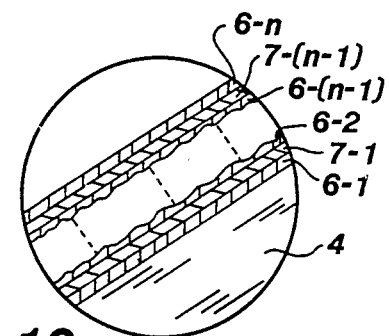
FIG. 10 generally illustrates in cross section a multilayer dielectric interference filter used in the present invention.

Interference filters have been manufactured for use as band-pass filters and edge-type devices primarily for wavelength selection. Conventional interference filters comprise a plurality of layers of dielectric material for transmitting or reflecting incident radiation. FIG. 10 illustrates in cross section a conventional arrangement of alternating quarterwave dielectric layers, 6-1 through 6-n and 7-1 through 7-(n-1), on substrate 4, which may be a transmissive material. With sufficient layers, nearly all of the incident radiation can be reflected. With edge-type filters, substantially all of the incident radiation can be transmitted on one side of the wavelength edge. FIG. 9, showing a spectral transmittance scan for a long-pass edge filter, was measured by a spectrophotometer. A substantially identical curve could also be generated by a computer program using filter coating parameters input by a design engineer. The edge is essentially a region where the transmittance T or reflectance R changes rapidly with wavelength. In the absence of scattering or absorption, $T+R=1$.

As shown in FIG. 9, the edge of interest is from about 350 nm to 370 nm. When the filter is tilted from a 0° angle of incidence to a larger angle of incidence, the transmittance response curve shifts to the left, so that the edge response occurs at shorter wavelengths. As a result, the transmittance at 350 nm increases from 10% at a 0° angle of incidence to about 50% at a 20° angle. This particular coating is a band-pass design, with another edge in the range of 325–340 nm, like that of a short-pass filter. In this case, an increase in angle of incidence will also cause the transmittance of 325 nm light to decrease.

Figure 3:
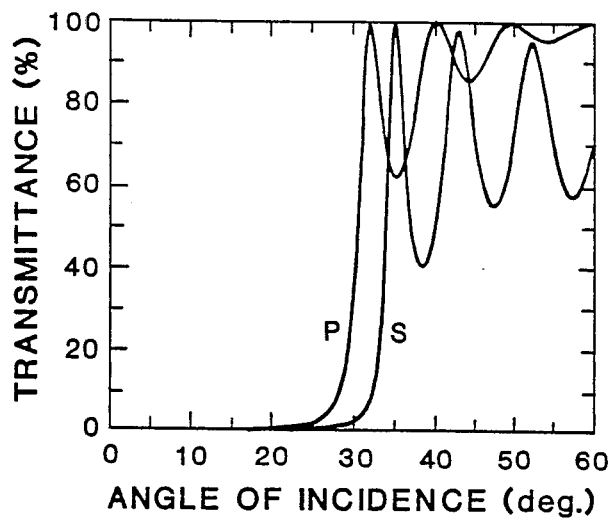
FIG. 3 graphically depicts calculated change in transmittance versus beam angle of incidence for p- or s-polarized radiation in a narrow-band reflector.

In accordance with the invention, it has been determined that the spectral response of an interference filter is a function of the angle of incidence of an input beam to the surface of the filter and the polarization of the input beam. If, for example, a normal-incidence reflective filter is tilted, its reflectance band shifts toward shorter wavelengths. Also, transmittance at the filter's design wavelength increases, first for p- and then for s-polarization. This is graphically illustrated in FIG. 3 for a reflective filter of narrow bandwidth. FIG. 3 specifically shows a change in transmittance as a function of the angle of incidence of a 248 nm beam on 49 alternating quarter-wave layers, 25 of $Al_2O_3$ and 24 of $SiO_2$.

As the filter is tilted, the transmittance first begins to increase for P-polarized light, and virtually reaches a maximum before any S-polarization is transmitted. Many lasers emit polarized light and in this case the filter response would be represented by one of these curves. Unpolarized lasers, however, can usually be modeled as having equal components of P- and S-polarization, and the result can be seen in FIG. 4.

Figure 4:
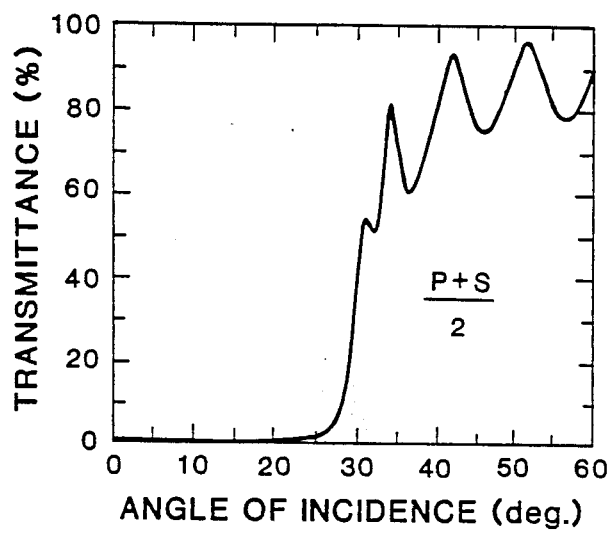
FIG. 4 graphically shows the calculated change in transmittance versus beam angle of incidence for unpolarized radiation in a narrow-band reflective filter.

The filters of FIGS. 3 and 4 are commonly known as multilayer reflectors, and are typically intended for use as mirrors which have a very high reflectivity at a specific wavelength. These work well in reflective attenuators, but are less efficient than edge filters in transmissive attenuators. The primary difference is that edge filters are designed to minimize the spectral oscillations like those above 30° in FIG. 3.

Figure 5:
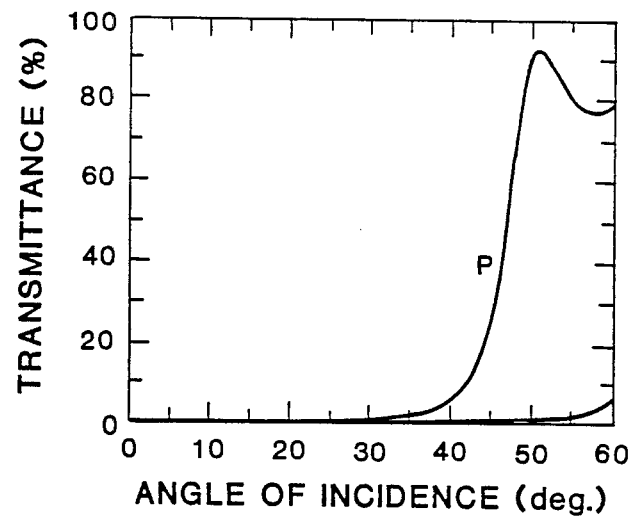
FIG. 5 graphically illustrates calculated change in transmittance versus beam angle of incidence for a reflector of moderate bandwidth.
Figure 6:
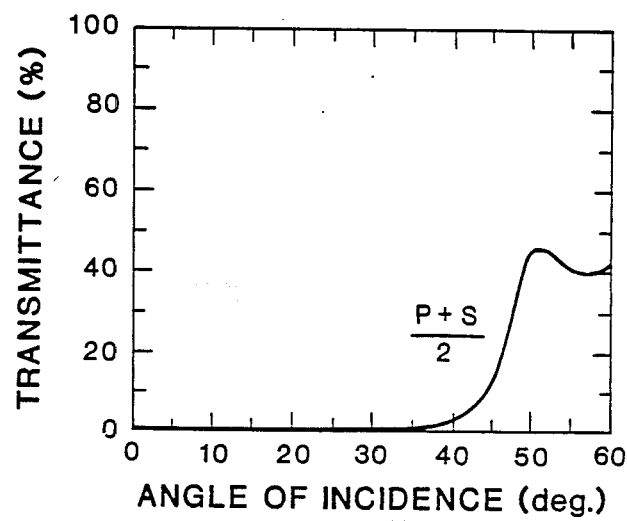
FIG. 6 graphically represents the calculated change in transmittance versus beam angle of incidence for a reflector of moderate bandwidth with unpolarized light.

Such oscillations can be a problem if they occur on the part of the curve used for attenuation. For example, the oscillation at 32° in FIG. 4 is undesirable from the point of view of computer-controlled attenuation. To correct this situation, a narrow-band reflector can be designed to minimize the splitting of the two polarizations. Conversely a broad-band reflector, like that shown in FIGS. 5 and 6, has such a high degree of splitting that it is unsuitable for use with unpolarized light. Common edge filters also produce polarization splitting, but so-called nonpolarizing designs are available to minimize this effect.

For polarized input and ideal nonabsorbing films, transmittance at fixed wavelengths varies from essentially 100% to 0% over a range of 12° for the angle of incidence of the beam to the filter's surface. FIG. 4 illustrates transmittance as a function of angle of incidence to a reflective filter for an unpolarized incident beam. As shown therein, reflectance (1-transmittance) varies from 100% at 20° to less than 20% at 33°. This variation in reflectance, obtainable for unpolarized incident radiation, is the basis for a reflective embodiment of the invention utilizing reflective multilayer dielectric filters for controllably attenuating a laser beam. Even better performance is obtainable using long and short pass filters or nonpolarizing edge filters in accordance with the invention.

Figure 7:
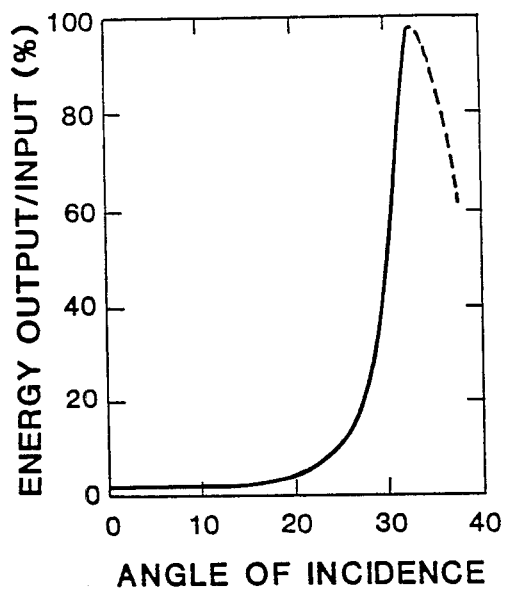
FIG. 7 graphically shows the calculated change in transmittance versus beam angle of incidence for a transmissive attenuator at 351 nm using two $Al_2O_3$ and $SiO_2$ layered-edge filters having AR (antireflection) coated back surfaces.

FIG. 7 shows response for a transmissive attenuator at 351 nm (unpolarized) using two $Al_2O_3/SiO_2$ edge filters with antireflection-coated back surfaces. Actual transmittance for these filters was found to be variable from 0.3% to 88% over a 28° tuning range.

Figure 1:
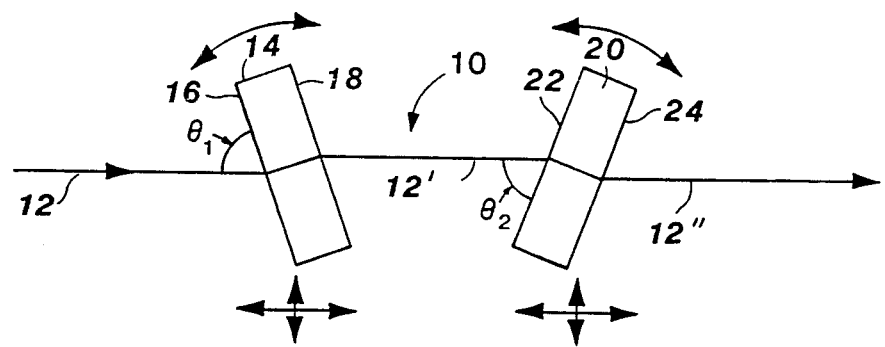
FIG. 1 schematically illustrates a transmissive embodiment of the invention.

Reference is now made to FIG. 1 which shows a transmissive embodiment of the invention 10. As seen therein, a laser input beam 12 is directed onto a first element 14 comprising surfaces 16 and 18, is transmitted thereby, and leaves element 14 as beam 12'. A second element 20 comprising surfaces 22 and 24 receives and transmits beam 12', which leaves element 20 as output beam 12''.

In accordance with the invention, either one or both of elements 14 and 20 may comprise transmissive interference filters, such as multilayer dielectric interference filters. If, for example, element 14 alone comprises such a filter, element 20 may comprise an optical element suitable for refracting beam 12' to align with a desired path as beam 12''. Alternatively, element 20 may alone be a filter and element 14 may be an optical element used to control beam path. Both elements 14 and 20 may comprise filters and also be used for beam path control.

Elements 14 and 20 are each rotatable about corresponding axes of rotation and may be selectively spaceable relative to one another as indicated by the arcuate and straight line double headed arrows. As shown, the axes of rotation are perpendicular to the plane of the drawing and the translational axes lie in the plane of the drawing. It will be understood by those skilled in the art that conventional optical bench structural devices will support and move the elements of the invention. In such manner the elements 14 and 20 are rotatably positionable and selectively spaceable in practicing the invention.

Any one of the surfaces 16 and 18 of element 14 and 22 and 24 of element 20 or any combination thereof may contain multilayered coatings as generally shown in FIG. 10, in accordance with the invention. A specific arrangement is selected as a function of the desired sensitivity, i.e., sharpness of the edge, the degree of polarization, and the specific laser frequency being attenuated. Thus, in a two filter embodiment, for example, surfaces 16 and 22 could comprise coated layers. Similarly layers 18 and 24, 16 and 24, and 18 and 22 could comprise coated layers. Too, surfaces 16, 18 and 22 or any other combination of three or all four surfaces may comprise multilayer coatings. Those skilled in the art will recognize which surfaces may comprise multilayer coatings in specific applications. Three, four or more elements may be used to practice the invention, which is not limited to the two element embodiment of FIG. 1 for purposes of illustration. The elements may be separated from one another by other optical devices such as reflectors, polarizers, filters, collimators and the like in practicing the invention.

Angles of incidence $\theta_1$ and $\theta_2$ may be the same or different, depending on the particular application. For example, each element may be used for band-edge attenuation. If one element is used to attenuate the upper edge of a desired band, it will be placed at an angle of incidence $\theta_1$ to the beam. The second element will be placed at a second angle of incidence $\theta_2$ to the beam to attenuate the lower edge of the band. The elements may comprise the same or different types of filters.

Figure 2:
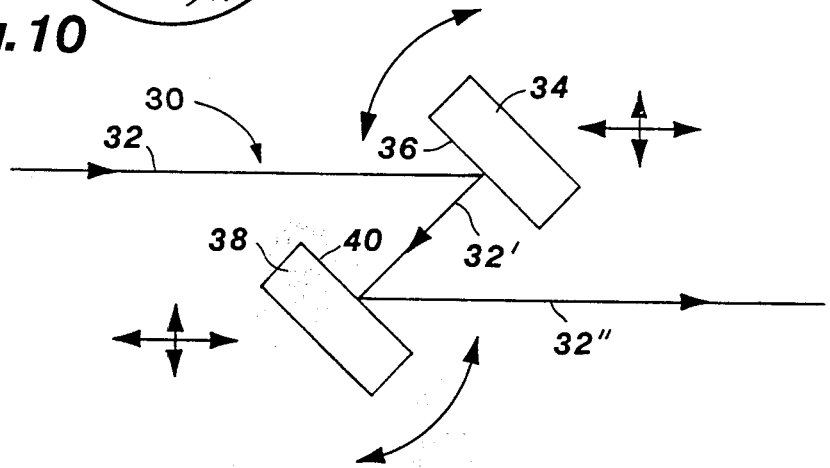
FIG. 2 schematically shows a reflective embodiment of the invention.

FIG. 2 schematically illustrates a reflective embodiment 30 of the invention. As shown therein, a laser beam 32 impinges on a surface 36 of a reflective element 34 reflects therefrom as beam 32' onto surface 40 of second reflective element 38, and outputs therefrom as beam 32", where surfaces 36 and 40 are generally formed as shown in FIG. 10. Elements 34 and 38 are rotatably positionable relative to one another about corresponding axes of rotation perpendicular to the plane of the drawing. Elements 34 and 38 are also selectively spaceable relative to one another along translational axes in the plane of the drawing to maintain relative beam incidence during element rotations. Rotational and translational movability are represented by the double-headed arcuate and straight line arrows. Those skilled in the art will recognize that conventional optical bench devices may be used to support the elements of this invention. Computer control can be used to automatically control the angle of incidence to variably attenuate a laser beam in both the refractive embodiment of FIG. 1 and the reflective embodiment of FIG. 2.

Figure 8:
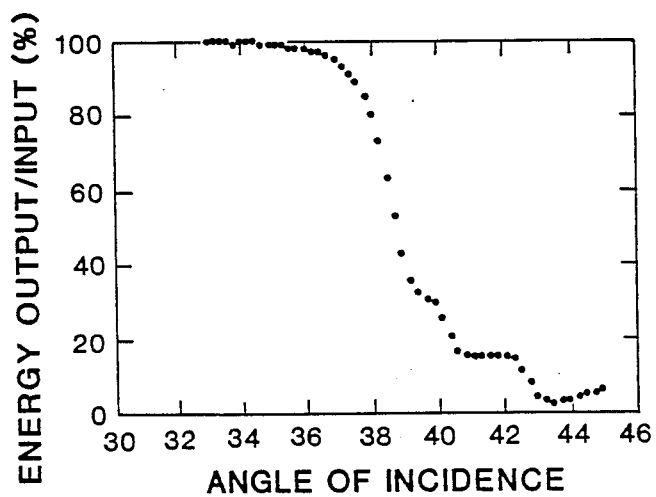
FIG. 8 shows measured beam energy transmittance versus beam angle of incidence for a reflective attenuator for 248 nm unpolarized radiation.

FIG. 8 shows a plot of transmitted energy fraction versus angle of incidence for a reflective attenuator constructed as shown in FIG. 2. The reflectors were well centered at 248 nm and comprised 49 alternating layers of $Al_2O_3$ and $SiO_2$, providing a FWHM (full width at half maximum) bandwidth of only 24 nm. Energy throughput was varied from approximately 99% to 3% over a 10° angle of incidence tuning range. The small ripples in the response function for the off-the-shelf reflectors used cause no problems in many applications but they can be eliminated by using alternative coatings. The small difference in the results achieved as shown in FIG. 8 and the calculated prediction shown in FIG. 3 are the result of using a value of 1.70 for the index of refraction for $Al_2O_3$ instead of the truer value of 1.65 in the calculations for FIGS. 3 and 4.

The foregoing description of the preferred embodiments of the invention have been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An apparatus for attenuating a laser beam having a selected wavelength comprising:
   at least one rotatably positionable transmissive interference filter having a transmission response edge functionally related to said selected wavelength; and
   means for positioning said filter within the path of said laser beam at a selectable angle of incidence thereto, said filter being positioned to intercept and partially transmit said beam, to thereby attenuate said beam an amount functionally related to said angle of incidence.

2. The invention of claim 1 wherein said filter comprises multilayered dielectric material on one side of a transmissive element.

3. The invention of claim 1 wherein said filter comprises multilayered dielectric material on both sides of a transmissive element.

4. The invention of claim 1 further comprising a beam refractor for axially aligning said beam.

5. The invention of claim 1 wherein said laser beam is essentially unpolarized.

6. The invention of claim 5 wherein said laser beam is from an excimer laser.

7. The invention of claim 1 wherein each said filter comprises a nonpolarizing edge filter.

8. The invention of claim 1 wherein said laser beam is polarized.

9. The invention of claim 1 wherein each said filter comprises a multilayer dielectric filter comprising quarter-wave layers of dielectric material.

10. The invention of claim 1 wherein each said filter comprises a band pass filter.

11. An apparatus for attenuating a laser beam having a selected wavelength comprising:
    a plurality of selectively spaceable and rotatably positionable reflective multilayer dielectric interference filters having corresponding reflection response edges functionally related to said selected wavelength;
    means for positioning each of said filters within the path of an input laser beam at a selectable angle of incidence thereto, said filters being positioned to consecutively intercept said beam, to thereby attenuate said beam an amount functionally related to said angle of incidence.

12. The invention of claim 11 wherein said laser beam is essentially unpolarized.

13. The invention of claim 12 wherein said laser beam is from an excimer laser.

14. The invention of claim 11 wherein at least one of said dielectric filters comprises a nonpolarizing edge filter.

15. The invention of claim 11 wherein said laser beam is polarized.

16. The invention of claim 11 wherein said dielectric filters comprise quarter-wave dielectric reflectors.

17. The invention of claim 11 wherein said dielectric filters comprise long pass filters.

18. The invention of claim 11 wherein said dielectric filters comprise short pass filters.

19. The invention of claim 11 wherein said dielectric filters comprise narrow bandwidth filters.

20. An apparatus for attenuating a laser beam having a selected wavelength and amount of polarization, said apparatus comprising:
  a plurality of selectively spaceable and rotatably positionable interference filters;
  means for positioning each of said filters within the path of an input laser beam at a selectable angle of incidence thereto, said filters being positioned to consecutively intercept said beam, to thereby attenuate said beam an amount functionally related to said angle of incidence and the amount of polarization of said input laser beam.

* * * * *